(12) United States Patent
Moore et al.

(10) Patent No.: US 7,529,801 B2
(45) Date of Patent: May 5, 2009

(54) METHOD AND SYSTEM FOR MULTIPLE INSTANT MESSAGING LOGIN SESSIONS

(75) Inventors: Jason Eric Moore, Austin, TX (US); Rafael Graniello Cabezas, Austin, TX (US); Elizabeth Silvia, Austin, TX (US); Liliana Orozco, Del Valle, TX (US)

(73) Assignee: International Business Machines Corporation, Armonk, NY (US)

( * ) Notice: Subject to any disclaimer, the term of this patent is extended or adjusted under 35 U.S.C. 154(b) by 824 days.

(21) Appl. No.: 10/703,019

(22) Filed: Nov. 6, 2003

(65) Prior Publication Data

US 2005/0102365 A1    May 12, 2005

(51) Int. Cl.
    G06F 15/16    (2006.01)
(52) U.S. Cl. .................................................. 709/206
(58) Field of Classification Search ......... 709/206–207, 709/245, 229; 726/2
    See application file for complete search history.

(56) References Cited

U.S. PATENT DOCUMENTS

| 7,043,538 B2* | 5/2006 | Guedalia et al. ............ 709/220 |
| 7,143,443 B2* | 11/2006 | Song et al. .................... 726/29 |
| 2001/0013050 A1* | 8/2001 | Shah .......................... 709/202 |
| 2002/0130904 A1 | 9/2002 | Becker et al. ............... 345/753 |
| 2002/0174248 A1 | 11/2002 | Morriss ....................... 709/204 |
| 2003/0020750 A1 | 1/2003 | Brown et al. ................ 345/752 |
| 2003/0030670 A1 | 2/2003 | Duarte et al. ............... 345/758 |
| 2003/0101343 A1* | 5/2003 | Eaton et al. ................. 713/170 |

FOREIGN PATENT DOCUMENTS

| JP | 09-146882 | 6/1997 |
| JP | 2003-091491 | 3/2003 |
| WO | 03-063524 A1 | 7/2003 |

OTHER PUBLICATIONS

Peter Saint-Andre, Jabber Protocol Overview, Version 1.4, dated Sep. 22, 2003 via Wayback Machine at www.archive.org, pp. 1-62.*
Internet telephone service TaRaBa using MSX Softphone, retrieved Mar. 1, 2007, pp. 1-2. http://internet.watch.impress.co.jp/cda/news/2004/05/17/3135.html.

* cited by examiner

*Primary Examiner*—Andrew Caldwell
*Assistant Examiner*—Grant Ford
(74) *Attorney, Agent, or Firm*—Yee & Associates, P.C.; Libby Z. Handelsman

(57) ABSTRACT

A mechanism for multiple instant messaging (IM) sessions associated with a single user name is provided. A frontend server receives user login requests and routes the instant messaging system to a back-end server. Each login associated with a particular user name is routed to the same backend server (or IM host). Messages targeted to a recipient having a plurality of active IM sessions are broadcast to all the active sessions. Messages targeted to recipients having a single IM session are unicast.

6 Claims, 5 Drawing Sheets

METHOD AND SYSTEM FOR MULTIPLE INSTANT MESSAGING LOGIN SESSIONS

TECHNICAL FIELD

The present invention relates to data processing systems for instant messaging services, and in particular, to data processing systems admitting multiple instant messaging login sessions.

BACKGROUND INFORMATION

Instant messaging systems are becoming an increasingly popular communications vehicle in both the individual and enterprise environments. Instant messaging allows the real-time exchange of messages and presence between two network-connected parties. Although outwardly, similar to e-mail, instant messaging systems deliver messages in near realtime because this instant messaging system is aware of the recipient's presence on the network. Although instant messaging systems and e-mail are typically both based on a client-server model, e-mail is a store and forward system. The sender of an e-mail message uses an e-mail client (also referred to as a Mail User Agent (or MUA) which sends the message to a Mail Transfer Agent (MTA) which further forwards the message through the network to an MTA of the recipient. That is, a "mail server" to which the recipient is connected. The e-mail message is stored on the recipient's MTA. The message is stored until the recipient retrieves its e-mail from the MTA, typically using a Post Office Protocol, or POP, client deployed on the recipient's personal computer or work station.

By contrast, with instant messaging, the sender's instant messaging (IM) client sends the message to an IM server which then sends the message on to the recipient without storing the message. In other words, typical IM systems are not store-and-forward architectures. Furthermore, IM systems typically permit only one active IM session per user name. Therefore, if a user changes work location, say from an office to a laboratory, they must log out of any active IM session and log in from the new location. In the interim, they cannot receive messages.

Consequently, there is a need in the art for mechanisms to permit multiple active IM sessions. In particular, there is a need in the art for systems and methods to permit multiple active IM sessions without circumventing congestion and traffic flow mechanisms built into the IM system.

SUMMARY OF THE INVENTION

The aforementioned needs are addressed by the present invention. Accordingly, there is provided a method for multiple instant messaging sessions. the method includes assigning a first login request to an instant messaging (IM) host server in response to a login request. Each login request has a login identifier associated with a user requesting the login. The first request is passed to the assigned IM host server. In response to a second login request having a same login identifier as the first login request, the second login request is passed to the IM host server assigned in conjunction with the first request.

The foregoing has outlined rather broadly the features and technical advantages of one or more embodiments of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
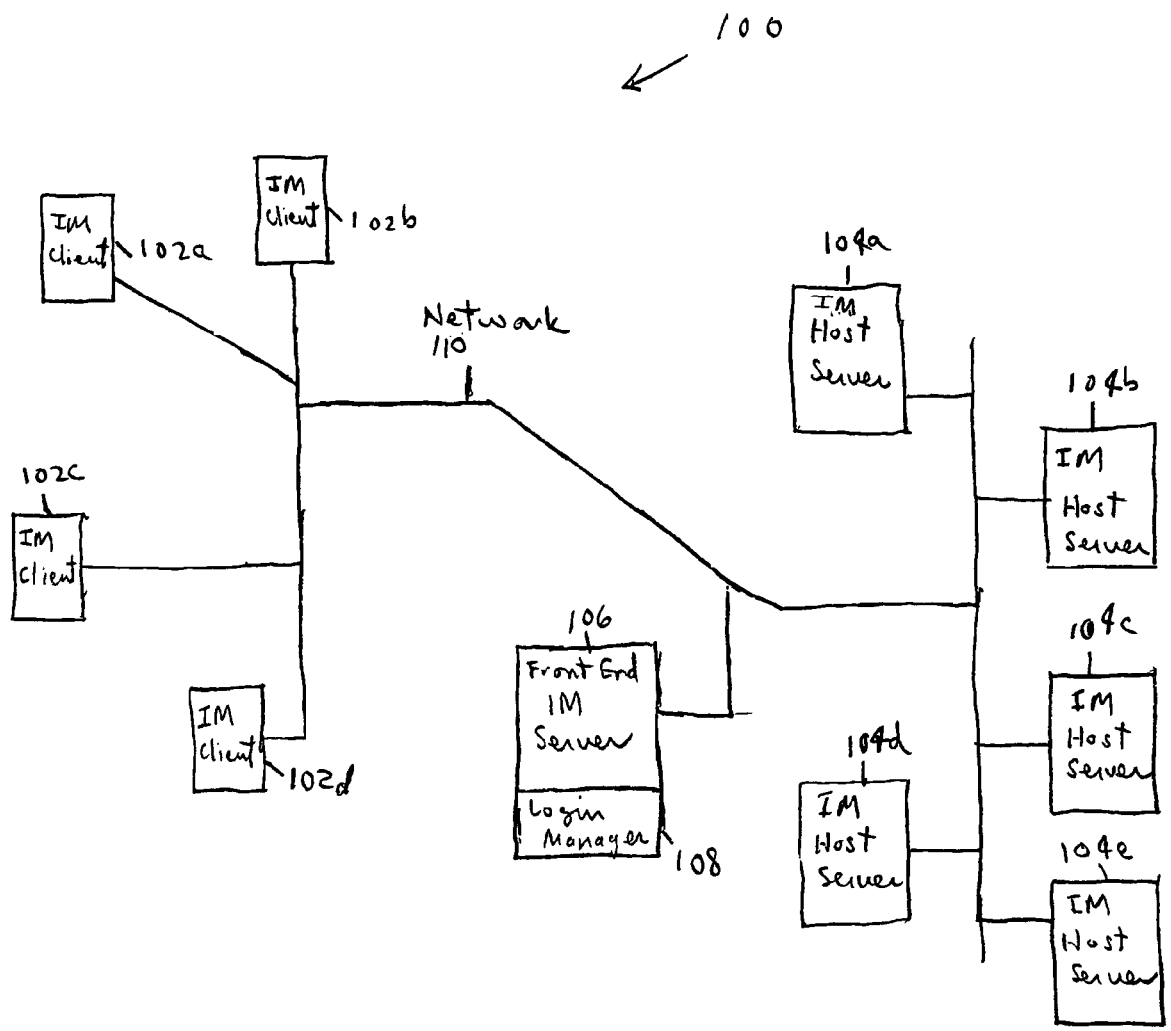
FIG. 1 illustrates, an instant messaging architecture in accordance with the principles of the present invention.

A mechanism for multiple instant messaging sessions associated with a single user name is provided. A frontend server receives user login requests and routes the instant messaging system to a back-end server. Each login associated with a particular user name is routed to the same backend server. Messages targeted to a recipient having a plurality of active IM sessions are multicast to all the active sessions. Messages targeted to recipients having a single IM session are unicast.

In the following description, numerous specific details are set forth to provide a thorough understanding of the present invention. For example, particular instant messaging protocols may be referred to, however, it would be recognized by those of ordinary skill in the art that the present invention may be practiced without such specific details, and in other instances, well-known circuits have been shown in block diagram form, in order not to obscure the invention in order not to obscure the present invention in unnecessary detail. Refer now to the drawings wherein depicted elements are not necessarily shown to scale, and wherein like or similar elements are designated by the same reference numeral through these several views.

FIG. 1 illustrates an instant messaging (IM) architecture 100 which may be used in conjunction with the present invention. A plurality of IM clients 102 may exchange instant messages with each other via the mediation of one or more IM host servers 104a-e. (Host servers may also be referred to as backend servers.) As previously noted, IM systems are typically built on a client-server model (in contrast to a peer-to-peer model). Several IM protocols which define IM message formats have been developed. However, the particular IM protocol used does not, in general, implicate the present inventive principles. One such generally available and open-source protocol based on XML (extensible Markup Language) is Jabber. (Jabber is promulgated by the Jabber Software Foundation, Denver, Colo.)

A user desiring to engage in an IM communication with another user logs into an IM host server via an IM client deployed on the users personal computer or workstation, such as one of IM clients 102a-102d. In architecture 100, FIG. 1, to facilitate congestion and traffic flow management, logins are initiated through a frontend IM server 106. Login requests are processed by a login manager 108 in frontend server 106. The operation of login manager 108 in accordance with the principles of the present invention, will be described in conjunction with FIG. 2. Additionally, the network connectivity of frontend server 106 and host servers 104a-104e, represented by network 110 in architecture 100 may be a local area network (LAN) or a wide area network (WAN) such as maybe found in an enterprise environment, or may be the Internet. Again, the principles of the present invention are not implicated by the particular network to which the IM clients and IM servers are connected. Messages between IM clients are sent to the IM host server to which the sending client is connected. The server then routes the message to the recipient's IM host server, that is the IM host server to which the recipient is connected, which need not be the same as the host server of the sender. Additionally, each client is responsible for providing its server, that is the IM host server to which it is connected with presence messages. For example, if a recipient leaves his or her workstation and is therefore unavailable to participate in an IM exchange, the IM client should indicate the unavailability of the recipient to its host server. As previously noted, one aspect of instant messaging that distinguishes it from e-mail is the awareness of presence, that is that message recipients are available, or at least that their clients are available. In other words, the IM client is responsible for reporting its status to IM host server with respect to the user's availability to participate in an IM session. Typically, this is effected by passing a presence information message to the IM host server. If the user locks his or her workstation and is not available to engage in an essentially real-time IM session, this may be reported to the IM host server. Similarly, if the user logs out, this may also be reported to the IM server.

Figure 4:
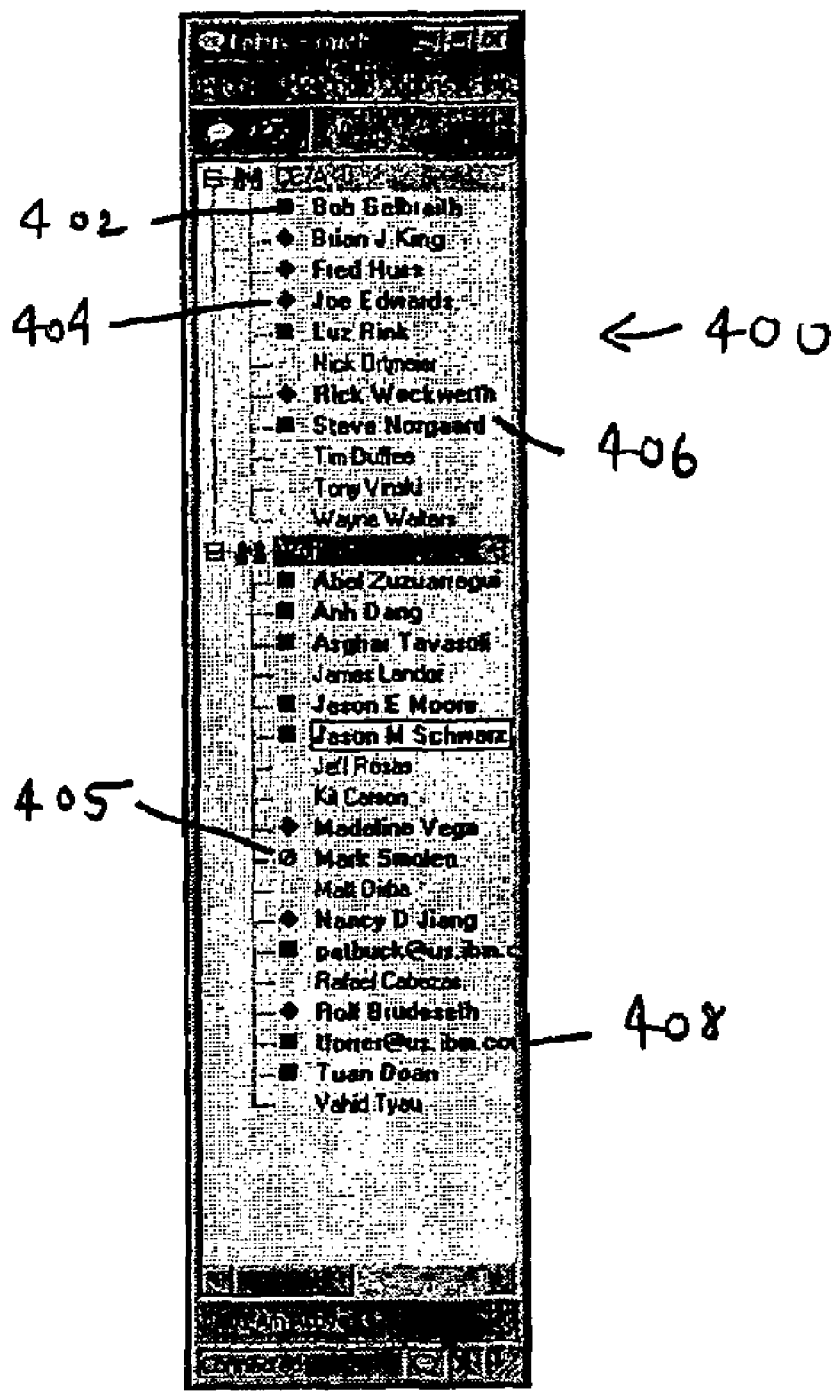
FIG. 4 illustrates an exemplary display screen shot of a user's contact list which may be used in conjunction with the present invention.

This may be further understood by referring to FIG. 4 illustrating a screen shot 400 of a display of an exemplary user's list of IM contacts. A particular contact's presence is denoted by an iconic symbol. A square-shaped icon 402 indicates that the user is logged on and active. A diamond-shaped icon 404 shows that the user is logged into the IM system, but that her or she is unavailable, that is has locked his or her workstation. Additionally, a contact may choose not to participate in instant messaging without logging out by indicating that he or she does not want to "be disturbed." That contact's presence status is depicted as a "circle and diagonal" icon 405. Note that contacts may appear in a user's contact list as an alias, such as the contacts name (e.g. contact 406) or in the form of the contact's node/domain (e.g. contact 408). Typically, these are in the same form as the familiar email address, node@domain.

Figure 2:
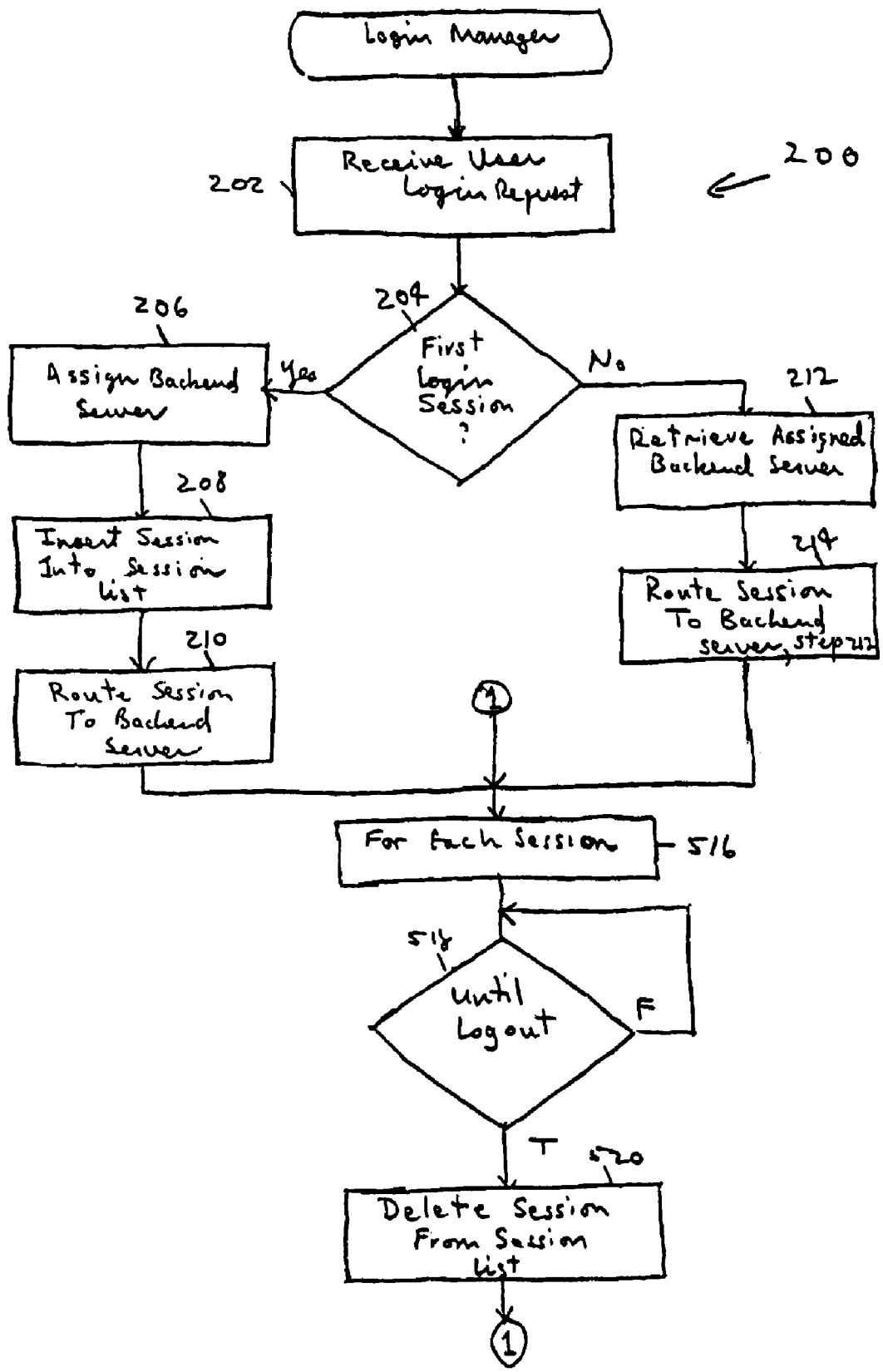
FIG. 2 illustrates, in flowchart form, an instant messaging login manager methodology in accordance with an embodiment of the present invention.

FIG. 2 illustrates a login manager process 200 in accordance with the present inventive principles. In particular, login manager 200 operates to manage multiple IM active sessions. In step 202, a user login request is received. In response, it is determined in step 204 if there is a pre-existing login session for this user name. A determination may be made, for example, by the frontend server, such as frontend server 106, FIG. 1, maintaining a list of sessions and, as discussed below, the IM host, or backend server, to which they are connected. In step 206, a backend server is assigned, and the assigned server is inserted into the session list in step 208. In step 210, the session is routed to the backend server assigned in step 206.

Once the frontend server establishes a connection with the user, the workload management task is called to find a backend server with sufficient bandwidth to service the new IM session. The frontend server then transfers the session login information to the backend server to handle all IM traffic. Each backend server may maintain a list of host IP addresses (i.e., the IP address of each connected IM client) and the corresponding login ID. In accordance with the present invention, a given login ID may be associated with multiple IP addresses.

Returning to step 204, if it is determined that a login session is already associated with the login user name, in step 212 the backend server assigned to the active session is retrieved from the session list. In step 214, the new session is routed to the backend server retrieved in step 212. In this way, all active sessions for a given user are handled by the same backend server. The backend server updates its list of host IP addresses to include the IP address of the IM client making the login request. A methodology for instant messaging across multiple sessions, which may be used by a backend server in accordance with the present invention is described in conjunction with FIG. 3.

A given user may appear in the session list as long as that user is logged into at least one session, and sessions are deleted from the list as the user logs out of the sessions. Thus, for each session for a particular user, step 516, until the user logs out of the session, step 518, the user's login ID and session remain in the session list. When the user logs out of a session, that session is deleted from the session list, step 520. In this way, methodology 200 may, in step 204, determine if a given user has an active IM login by comparing the login user name or ID with the entries in the session list.

Figure 3:
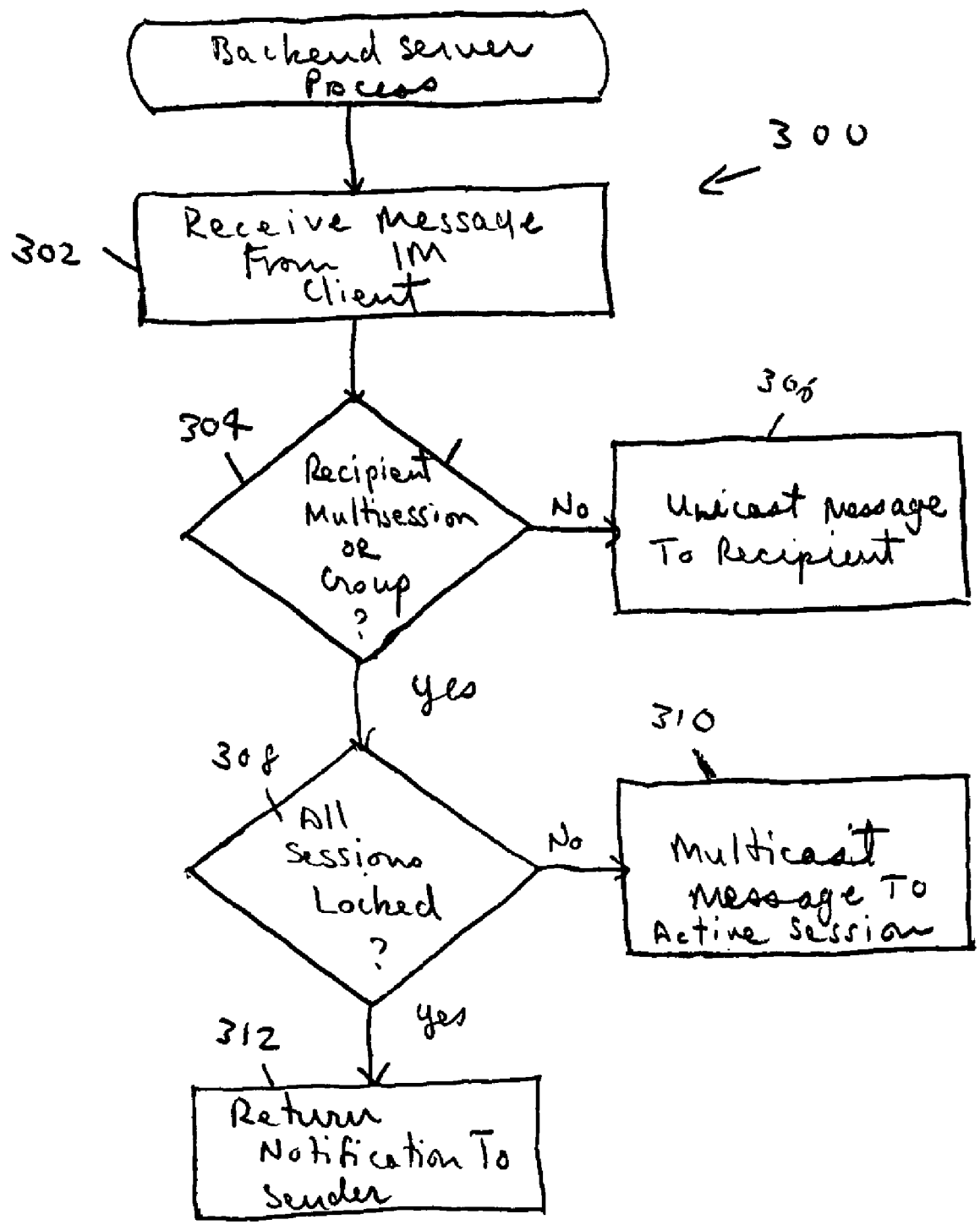
FIG. 3 illustrates, in flowchart form, an instant messaging backing server methodology in accordance with the principles of the present invention.

Refer now to FIG. 3 illustrating, in flowchart form, a backend server process 300 for instant messaging between users with multiple IM login sessions. In step 302, a message is received from an IM client. If, in step 304, the message recipient has a single login session, the message is unicast to that recipient, step 306. Conversely, if the recipient has multiple login sessions (the "Yes" branch in step 304), it is determined, step 308 if all the IM login sessions are locked for that recipient. As previously discussed, the backend server may maintain a list of ID's currently active on the server and the corresponding host IP addresses. The server may also keep the status of each host in the list. If not, the message is multicast to the active sessions, step 310. Conversely, if all of the recipient sessions are locked, then a notification that the recipient is unavailable is returned to the sender in step 312.

Returning to step 304, a group of recipients identified collectively via a group name may be similarly targeted. If the recipient of the instant message received in step 302 is a group in step 304, then it is determined in step 308 if any members of the group are available, that is their session is unlocked. If so, then the message is multicast to the active session or sessions in step 310. If no members of the group are available, then a notification is returned to the sender of the message. Note that as previously described, this may be displayed to the sender in the form of an icon associated with the recipient's user name.

Figure 5:
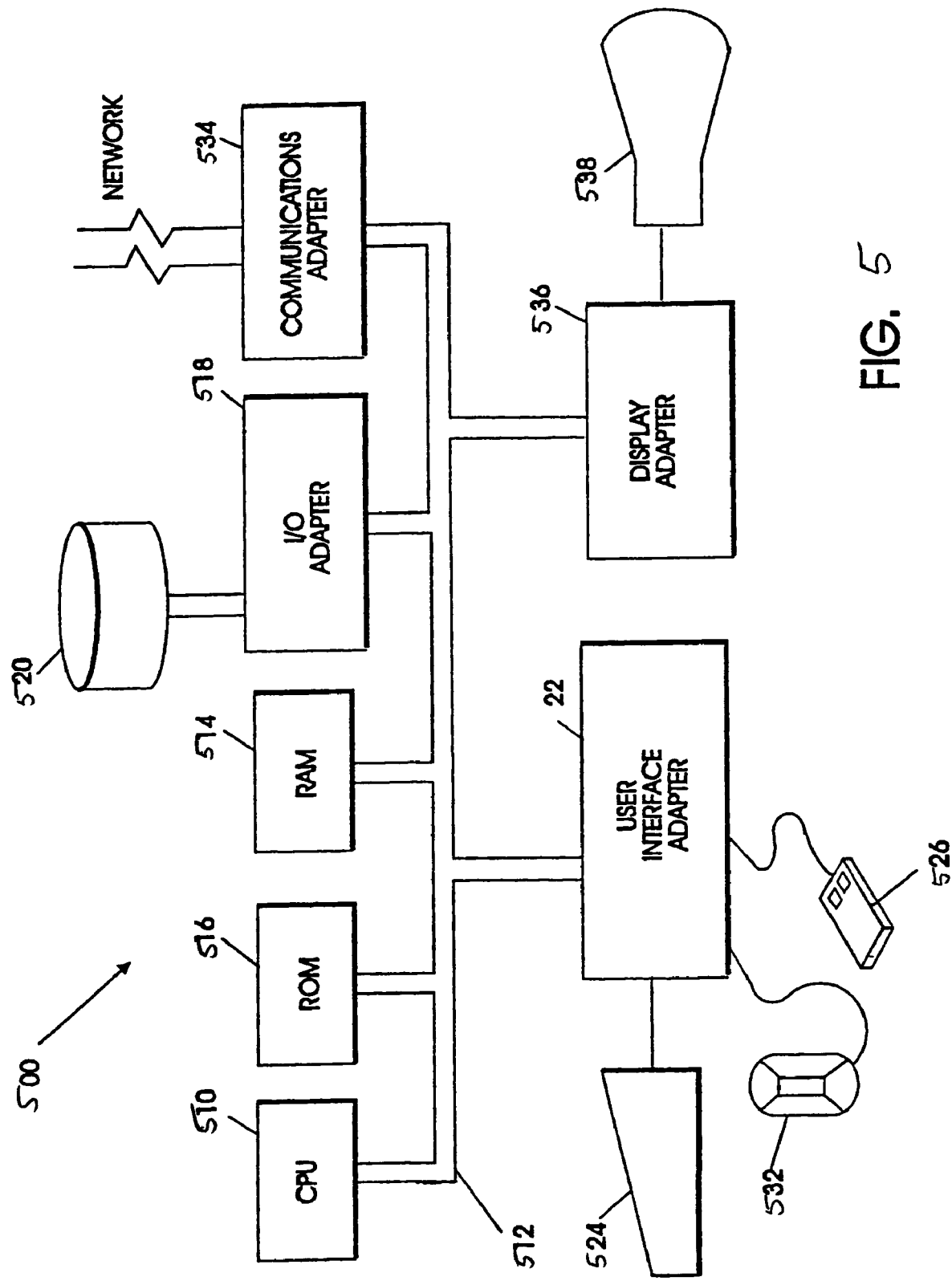
FIG. 5 illustrates, in block diagram form, a data processing system which may be used in conjunction with the methodologies incorporating the present inventive principles.

FIG. 5 illustrates an exemplary hardware configuration of data processing system 500 in accordance with the subject invention. Such a hardware configuration may be used as components of a data processing system, in conjunction with the methodologies illustrated in FIGS. 2 and 3, to manage instant message login sessions in accordance with the present inventive principles. Data processing system 500 includes central processing unit (CPU) 510, such as a conventional microprocessor, and a number of other units interconnected via system bus 512. Data processing system 500 also includes random access memory (RAM) 514, read only memory (ROM) 516 and input/output (I/O) adapter 518 for connecting peripheral devices such as disk units 520 to bus 512, user interface adapter 522 for connecting keyboard 524, mouse 526, trackball 532 and/or other user interface devices such as a touch screen device (not shown) to bus 512. (It would be appreciated by persons of ordinary skill in the art that an embodiment of system 500 configured as a server may omit some or all of the user interface devices.) System 500 also includes communication adapter 534 for connecting data processing system 500 to a data processing network, enabling the system to communicate with other systems, and display adapter 536 for connecting bus 512 to display device 538. CPU 510 may include other circuitry not shown herein, which will include circuitry commonly found within a microprocessor, e.g. execution units, bus interface units, arithmetic logic units, etc. CPU 510 may also reside on a single integrated circuit.

Preferred implementations of the invention include implementations as a computer system programmed to execute the method or methods described herein, and as a computer program product. According to the computer system implementation, sets of instructions for executing the method or methods are resident in the random access memory 514 of one or more computer systems configured generally as described above. These sets of instructions, in conjunction with system components that execute them may manage multiple instant message login sessions as described hereinabove. Until required by the computer system, the set of instructions may be stored as a computer program product in another computer memory, for example, in disk drive 520 (which may include a removable memory such as an optical disk or floppy disk for eventual use in the disk drive 520). Further, the computer program product can also be stored at another computer and transmitted to the users work station by a network or by an external network such as the Internet. One skilled in the art would appreciate that the physical storage of the sets of instructions physically changes the medium upon which is the stored so that the medium carries computer readable information. The change may be electrical, magnetic, chemical, biological, or some other physical change. While it is convenient to describe the invention in terms of instructions, symbols, characters, or the like, the reader should remember that all of these in similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

What is claimed is:

1. A method for multiple instant messaging sessions comprising:
    receiving a login request by a user for logging into an instant messaging session,
    determining if there is a pre-existing login session for the user;
    in response to determining that there is not a pre-existing login session for the user:
        assigning the login request to an instant messaging host server to provide an assigned instant messaging host server, wherein the login request has a login identifier associated with a user; and
        routing the login request to the assigned instant messaging host server; and
    in response to determining that there is a pre-existing login session for the user:
        routing the login request to the assigned instant messaging host server while the user is logged into the pre-existing login session, for providing a second login session for the user,
    wherein determining that ther is a pre-existing login session for the user comprises determining that the pre-existing login session is associated with the login identifier associated with the user.

2. The method of claim 1 wherein the pre-existing login session and the assigned instant messaging host server are in a session list, and wherein routing the login request to the assigned instant messaging host server includes retrieving the assigned instant messaging host server from the session list.

3. The method of claim 1 further comprising: in response to receiving a message for the user, determining if the user has multiple login sessions; and in response to determining that the user has multiple login sessions, multicasting the message to active ones of the multiple login sessions.

4. The method of claim 2 further comprising deleting the pre-existing login session from the session list, in response to a log out of the pre-existing login session.

5. The method of claim 3 wherein the active ones of the multiple login sessions comprise unlocked sessions.

6. The method of claim 3 wherein the user comprises a user group.

* * * * *